(12) United States Patent
Halasz

(10) Patent No.: US 7,260,620 B1
(45) Date of Patent: Aug. 21, 2007

(54) SYSTEM FOR SELECTING THE OPERATING FREQUENCY OF A COMMUNICATION DEVICE IN A WIRELESS NETWORK

(75) Inventor: David E. Halasz, Stow, OH (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 10/802,985

(22) Filed: Mar. 17, 2004

(51) Int. Cl.
*G06F 15/13* (2006.01)

(52) U.S. Cl. .................. 709/220; 455/450; 370/329

(58) Field of Classification Search .......... 709/220; 455/450; 370/329
See application file for complete search history.

(56) References Cited

U.S. PATENT DOCUMENTS

| | | | |
|---|---|---|---|
| 5,077,753 A | 12/1991 | Grau, Jr. et al. | |
| 5,210,771 A | 5/1993 | Schaeffer et al. | |
| 5,220,564 A | 6/1993 | Tuch et al. | |
| 5,412,687 A | 5/1995 | Sutton et al. | |
| 5,452,319 A | 9/1995 | Cook et al. | |
| 5,541,954 A | 7/1996 | Emi | |
| 5,621,767 A | 4/1997 | Brandt et al. | |
| 5,668,828 A | 9/1997 | Sanderford, Jr. et al. | |
| 5,697,059 A * | 12/1997 | Carney | 455/509 |
| 5,710,795 A | 1/1998 | Tsumura | |
| 5,774,808 A | 6/1998 | Sarkioja et al. | |
| 5,809,059 A | 9/1998 | Souissi et al. | |
| 5,844,936 A | 12/1998 | Lesthievent | |
| 5,889,768 A | 3/1999 | Storm et al. | |
| 5,950,124 A | 9/1999 | Trompower et al. | |
| 5,995,844 A * | 11/1999 | Fukuda | 455/462 |
| 6,032,046 A * | 2/2000 | Nakano | 455/450 |
| 6,069,871 A * | 5/2000 | Sharma et al. | 370/209 |
| 6,178,329 B1 * | 1/2001 | Chao et al. | 455/452.1 |
| 6,195,554 B1 * | 2/2001 | H'mimy et al. | 455/450 |
| 6,208,629 B1 * | 3/2001 | Jaszewski et al. | 370/329 |
| 6,208,836 B1 * | 3/2001 | Albuquerque Moraes et al. | 455/13.1 |
| 6,418,317 B1 * | 7/2002 | Cuffaro et al. | 455/450 |

OTHER PUBLICATIONS

AutoCell™ Self-Organizing WLANs, Propagate Networks, 4 pages, no date.
HotPoint™ 1000R Outdoor Wireless Mesh Router, firetide™ wireless instant networks™, 2 pages. 2003-2004, no date.
http://www.wi-fiplanet.com/news/article.php/2219011, Propagate's Embedded Software Calibrates WLANs, Jul. 21, 2004, pp. 1 and 2.
http://www.wi-fiplanet.com/news/article.php/3078631, FireTide Shows Off Mesh Router, Jul. 21, 2004, pp. 1 and 2.

* cited by examiner

*Primary Examiner*—Jinsong Hu
(74) *Attorney, Agent, or Firm*—Tucker Ellis & West LLP

(57) ABSTRACT

A system for automatically selecting communication frequencies for wireless communication devices (e.g., base unit, access point, and controller) being added to an existing wireless network. The operating frequencies, evaluated signal strength, and loads are used in determining the most suitable operating frequency. This automatic selection process eliminates the problems inherent in manual frequency selection.

12 Claims, 5 Drawing Sheets

DSSS FREQUENCIES FOR OPERATING IN DIFFERENT REGIONS

| CHANNEL NUMBER | NORTH AMERICAN FREQUENCIES | EUROPEAN FREQUENCIES | JAPANESE FREQUENCIES |
|---|---|---|---|
| 1 | 2412 MHz | N/A | N/A |
| 2 | 2417 MHz | N/A | N/A |
| 3 | 2422 MHz | 2422 MHz | N/A |
| 4 | 2427 MHz | 2427 MHz | N/A |
| 5 | 2432 MHz | 2432 MHz | N/A |
| 6 | 2437 MHz | 2437 MHz | N/A |
| 7 | 2442 MHz | 2442 MHz | N/A |
| 8 | 2447 MHz | 2447 MHz | N/A |
| 9 | 2452 MHz | 2452 MHz | N/A |
| 10 | 2457 MHz | 2457 MHz | N/A |
| 11 | 2462 MHz | 2462 MHz | N/A |
| 12 | N/A | N/A | 2484 MHz |

Fig. 3

SYSTEM FOR SELECTING THE OPERATING FREQUENCY OF A COMMUNICATION DEVICE IN A WIRELESS NETWORK

FIELD OF INVENTION

The present invention relates generally to a wireless communication system, and more particularly to a system for automatically selecting communication frequencies for wireless communication devices.

BACKGROUND OF THE INVENTION

The use of wireless networks has become prevalent throughout the modern workplace. For example, retail stores and warehouses may use a wireless local area network (LAN) to track inventory and replenish stock and office environments may use a wireless LAN to share computer peripherals. A wireless LAN offers several advantages over regular LANs. For example, users are not confined to locations previously wired for network access, wireless work stations are relatively easy to link with an existing LAN without the expense of additional cabling or technical support; and wireless LANs provide excellent alternatives for mobile or temporary working environments.

In general there are two types of wireless LANs, independent and infrastructure wireless LANs. The independent, or peer-to-peer, wireless LAN is the simplest configuration and connects a set of personal computers with wireless adapters. Any time two or more wireless adapters are within range of each other, they can set up an independent network. In infrastructure wireless LANs, multiple base stations link the wireless LAN to the wired network and allow users to efficiently share network resources. The base stations not only provide communication with the wired network, but also mediate wireless network traffic in the immediate neighborhood. Both of these network types are discussed extensively in the IEEE 802.11 standard for wireless LANs.

In the majority of applications, wireless LANs are of the infrastructure type. That is, the wireless LAN typically includes a number of fixed base stations, also known as access points, interconnected by a cable medium to form a hardwired network. The hardwired network is often referred to as a system backbone and may include many distinct types of nodes, such as, host computers, mass storage media, and communications ports. Also included in the typical wireless LAN are intermediate base stations which are not directly connected to the hardwired network.

These intermediate base stations, often referred to as wireless base stations, increase the area within which base stations connected to the hardwired network can communicate with mobile terminals. Associated with each base station is a geographical cell. A cell is a geographic area in which a base station has sufficient signal strength to transmit data to and receive data from a mobile terminal with an acceptable error rate. Unless otherwise indicated, the term base station, will hereinafter refer to both base stations hardwired to the network and wireless base stations. Typically, the base station connects to the wired network from a fixed location using standard Ethernet cable, although in some case the base station may function as a repeater and have no direct link to the cable medium. Minimally, the base station receives, buffers, and transmits data between the wireless local area network (WLAN) and the wired network infrastructure. A single base station can support a small group of users and can function within a predetermined range.

In general, end users access the wireless LAN through wireless LAN adapters, which are implemented as PC cards in notebook computers, ISA or PCI cards in desktop computers, or fully integrated devices within hand-held computers. Wireless LAN adapters provide an interface between the client network operating system and the airwaves. The nature of the wireless connection is transparent to the network operating system.

In general operation, when a mobile terminal is powered up, it "associates" with a base station through which the mobile terminal can maintain wireless communication with the network. In order to associate, the mobile terminal must be within the cell range of the base station and the base station must likewise be situated within the effective range of the mobile terminal. Upon association, the mobile unit is effectively linked to the entire LAN via the base station. As the location of the mobile terminal changes, the base station with which the mobile terminal was originally associated may fall outside the range of the mobile terminal. Therefore, the mobile terminal may "de-associate" with the base station it was originally associated to and associate with another base station which is within its communication range. Accordingly, wireless LAN topologies must allow the cells for a given base station to overlap geographically with cells from other base stations to allow seamless transition from one base station to another.

Most wireless LANs, as described above, use spread spectrum technology. Spread spectrum technology is a wideband radio frequency technique developed by the military for use in reliable, secure, mission-critical communication systems. A spread spectrum communication system is one in which the transmitted frequency spectrum or bandwidth is much wider than absolutely necessary. Spread spectrum is designed to trade off bandwidth efficiency for reliability, integrity, and security. That is, more bandwidth is consumed than in the case of narrowband transmission, but the tradeoff produces a signal that is, in effect, louder and thus easier to detect, provided that the receiver knows the parameters of the spread spectrum signal being broadcast. If a receiver is not tuned to the right frequency, a spread spectrum signal looks like background noise.

In practice, there are two types of spread spectrum architectures: frequency hopping (FH) and direct sequence (DS). Both architectures are defined for operation in the 2.4 GHz industrial, scientific, and medical (ISM) frequency band. Each occupies 83 MHz of bandwidth ranging from 2.400 GHz to 2.483 GHz. Wideband frequency modulation is an example of an analog spread spectrum communication system.

In frequency hopping spread spectrum systems the modulation process contains the following two steps: 1) the original message modulates the carrier, thus generating a narrow band signal; 2) the frequency of the carrier is periodically modified (hopped) following a specific spreading code. In frequency hopping spread spectrum systems, the spreading code is a list of frequencies to be used for the carrier signal. The amount of time spent on each hop is known as dwell time. Redundancy is achieved in FHSS systems by the possibility to execute re-transmissions on frequencies (hops) not affected by noise.

Direct sequence is a form of digital spread spectrum. With regard to direct sequence spread spectrum ("DSSS"), the transmission bandwidth required by the baseband modulation of a digital signal is expanded to a wider bandwidth by using a much faster switching rate than used to represent the original bit period. In operation, prior to transmission, each original data bit to be transmitted is converted or coded to a sequence of a "sub bits" often referred to as "chips" (having logic values of zero or one) in accordance with a conversion algorithm. The coding algorithm is usually termed a spreading function. Depending on the spreading function, the original data bit may be converted to a sequence of five, ten, or more chips. The rate of transmission of chips by a transmitter is defined as the "chipping rate."

As previously stated, a spread spectrum communication system transmits chips at a wider signal bandwidth (broadband signal) and a lower signal amplitude than the corresponding original data would have been transmitted at baseband. At the receiver, a despreading function and a demodulator are employed to convert or decode the transmitted chip code sequence back to the original data on baseband. The receiver, of course, must receive the broadband signal at the transmitter chipping rate.

The coding scheme of a spread spectrum communication system utilizes a pseudo-random binary sequence ("PRSB"). In a DSSS system, coding is achieved by converting each original data bit (zero or one) to a predetermined repetitive pseudo noise ("PN") code.

A PN code length refers to a length of the coded sequence (the number of chips) for each original data bit. As noted above, the PN code length effects the processing gain. A longer PN code yields a higher processing gain which results in an increased communication range. The PN code chipping rate refers to the rate at which the chips are transmitted by a transmitter system. A receiver system must receive, demodulate and despread the PN coded chip sequence at the chipping rate utilized by the transmitter system. At a higher chipping, the receiver system is allotted a smaller amount of time to receive, demodulate and despread the chip sequence. As the chipping rate increases so to will the error rate. Thus, a higher chipping rate effectively reduces communication range. Conversely, decreasing the chipping rate increases communication range. The spreading of a digital data signal by the PN code effect overall signal strength (or power) of the data be transmitted or received. However, by spreading a signal, the amplitude at any one point typically will be less than the original (non-spread) signal.

It will be appreciated that increasing the PN code length or decreasing the chipping rate to achieve a longer communication range will result in a slower data transmission rate. Correspondingly, decreasing the PN code length or increasing the chipping rate will increase data transmission rate at a price of reducing communication range.

FIG. 1 schematically illustrates a typical transmitter system 100 of a DSSS system. Original data bits 101 are input to the transmitter system 100. The transmitter system includes a modulator 102, a spreading function 104 and a transmit filter 106. The modulator 102 modulates the data using a well known modulation technique, such as binary phase shift keying ("BPSK"), quadrature phase shift keying (QPSK), and complimentary code keying (CCK). In the case of the BPSK modulation technique, the carrier is transmitted in-phase with the oscillations of an oscillator or 180 degrees out-of-phase with the oscillator depending on whether the transmitted bit is a "0" or a "1". The spreading function 104 converts the modulated original data bits 101 into a PN coded chip sequence, also referred to as spread data. The PN coded chip sequence is transmitted via an antenna so as to represent a transmitted PN coded sequence as shown at 108.

FIG. 1 also illustrates a typical receiver system or assembly, shown generally at 150. The receiver system includes a receive filter 152, a despreading function 154, a bandpass filter 156 and a demodulator 158. The PN coded data 108 is received via an antenna and is filtered by the filter 152. Thereafter, the PN coded data is decoded by a PN code despreading function 1544. The decoded data is then filtered and demodulated by the filter 156 and the demodulator 158 respectively to reconstitute the original data bits 101. In order to receive the transmitted spread data, the receiver system 150 must be tuned to the same predetermined carrier frequency and be set to demodulate a BPSK signal using the same predetermined PN code.

More specifically, to receive a spread spectrum transmission signal, the receiver system must be tuned to the same frequency as the transmitter assembly to receive the data. Furthermore, the receiver assembly must use a demodulation technique which corresponds to the particular modulation techniques used by the transmitter assembly (i.e. same PN code length, same chipping rate, BPSK). Because multiple mobile terminals may communicate with a common base, each device in the cellular network must use the same carrier frequency and modulation technique.

One parameter directly impacted by the practice discussed in the preceding paragraph is "throughput." Throughput or the rate of a system is defined as the amount of data (per second) carried by a system when it is active. As most communications systems are not able to carry data 100% of the time, an additional parameter, throughput is used to measure system performance. In general, throughput is defined, as the average amount of data (per second) carried by the system and is typically measured in bits per second ("bps"). The average is calculated over long periods of time. Accordingly, the throughput of a system is lower than its rate. When looking for the amount of data carried, the overhead introduced by the communication protocol should also be considered. For example, in an Ethernet network, the rate is 10 Mbps, but the throughput is only 3 Mbps to 4 Mbps.

One advantage of DSSS systems over FHSS systems is that DSSS systems are able to transmit data 100% of the time, having a high throughput. For example, systems operating at 11 Mbps over the air carry about 6.36 Mbps of data. FHSS systems can not transmit 100% of the available time. Some time is always spent before and after hopping from one frequency to another for synchronization purposes. During these periods of time, no data is transmitted. Obviously, for the same rate over the air, a FHSS system will have a lower throughput than an equivalent DSSS system.

Based on the IEEE 802.11 specifications, the maximum number of DSSS systems that can be collocated is three. These three collocated systems provide a brut aggregate throughput of 3×11 Mbps=33 Mbps, or a net aggregate throughput of 3×6.36 Mbps=19.08 Mbps. Because of the rigid allocation of sub-bands to systems, collisions between signals generated by collocated systems do not occur, and therefore the aggregate throughput is a linear function of the number of systems. FHSS technology allows the collocation of much more than 3 systems. However, as the band is allocated in a dynamic way among the collocated systems (they use different hopping sequences which are not synchronized), collisions do occur, lowering the actual throughput. The greater the number of collocated systems (base stations or access points), the greater the number of collisions and the lower the actual throughput. For small quantities of base stations or access points, each additional base station or access point brings in almost all its net throughput; the amount of collisions added to the system is not significant. When the number of base stations or access points reaches 15, the amount of collisions generated by additional access points is so high that in total they lower the aggregate throughput. In view of the foregoing, there are some important advantages in using DSSS. It should be appreciated that the terms "access point," "base station" and "controller" are used interchangeably herein. Furthermore it should be understood that in a typical WLAN configuration, an access point (e.g., transceiver device) connects to a wired network from a fixed location using a standard Ethernet cable. Typically, the access point receives, buffers, and transmits data between the wireless network (e.g., WLAN) and a wired network. A single access point can support a small group of users and can function within a range of less than one hundred feet to several hundred feet. End users access the WLAN through wireless LAN adapters, which may be implemented as PC cards in notebook computers, ISA or PCI cards in a desktop computer, or fully integrated devices within hand held computers. The WLAN adapters provide an interface between the client network operating system (NOS) and the airwaves (via an antenna).

One drawback to using DSSS, relates to the selection of an operating frequency when a DSSS access point is added to an existing LAN. In this regard, when an access point is added to an existing LAN, an operating frequency for the access point must be selected. This operating frequency is the one which will be used for communications between the newly added DSSS access point and other communication devices in the network (e.g., mobile units and other access points). In accordance with prior art practice, selection of the operating frequency for the newly added DSSS access point is performed manually. More specifically, a user determines which frequency is most suitable by determining and evaluating a variety of communication parameters, and then operating a computer on the network to select an operating frequency for the access point. This manual selection procedure is inefficient and time consuming. Moreover, it often does not result in an optimized configuration, and in fact, may result in serious errors in the frequency selection which impair communications in the existing LAN. With regard to optimized configurations, it should be recognized that multiple access points in an LAN may be operating on the same frequency. Therefore, it is desirable to allocate frequencies to access points in a manner which evenly distributes the number of access points operating on the same frequency. Moreover, in accordance with IEEE 802.11, some of the operating frequencies are "overlapping," while others are "non-overlapping." It is preferred that "non-overlapping" frequencies be selected, and the number of access points operating on the same frequencies are evenly distributed. It is also desirable for optimized communications, to evaluate the loads associated with each access point, and its corresponding frequencies. Thus, the operating frequency for the new access point can be selected such that it is not a frequency used by an access point with a high load.

SUMMARY OF THE INVENTION

According to the present invention there is provided a method for selecting an operating frequency for a communication device being added to a wireless network including one or more existing communication devices, the method comprising the following steps: (1) interrogating one or more of the existing communication devices to obtain communication parameter data indicative of at least the operating frequencies in use by the existing communication devices; (2) evaluating the communication parameter data; and (3) selecting the operating frequency of the communication device being added to the wireless communications network in accordance with said evaluated communication parameter data.

According to another aspect of the present invention there is provided an apparatus for selecting an operating frequency for a communication device newly added to a wireless network having one or more existing communication device, comprising: means for interrogating one or more of the existing communication devices to obtain communication parameter data indicative of at least the operating frequencies in use by the existing communication devices; means for evaluating the communication parameter data; and means for selecting the operating frequency for the communications device being added to the wireless communications network in accordance with said evaluated communication parameter data.

An advantage of the present invention is the provision of a system for selecting a an operating frequency for a communications device that automatically selects an operating frequency by evaluating one or more communication parameters of an existing wireless network.

Another advantage of the present invention is the provision of an automated system for automatically selecting an operating frequency for a communications device based upon a determination of the operating frequencies of other communication devices in a wireless network.

Still another advantage of the present invention is the provision of an automated system for selecting an operating frequency for a communications device based upon an evaluation of the load of other communication devices in a wireless network.

Still another advantage of the present invention is the provision of an automated system for selecting an operating frequency for a communications device that selects the operating frequency in such a manner that the operating frequencies of a plurality of communication devices in a wireless network is evenly distributed.

Yet another advantage of the present invention is the provision of an automated system for selecting an operating frequency for a communications device that selects an optimal non-overlapping operating frequency.

Yet another advantage of the present invention is the provision of an automated system for selecting an operating frequency for a communication device, wherein the selected operating frequency provides optimal throughput.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 3 is a table of DSSS operating frequencies according to the IEEE 802.11 standard.

DETAILED DESCRIPTION OF THE INVENTION

It should be appreciated that a preferred embodiment of the present invention as described herein makes particular reference to the IEEE 802.11 standard, and utilizes terminology referenced therein. However, it should be understood that reference to the IEEE 802.11 standard and its respective terminology is not intended to limit the scope of the present invention. In this regard, the present invention is suitably applicable to a wide variety of other communication systems which utilize a plurality operating frequencies for data transmission. Moreover, it should be appreciated that while the present invention has been described in connection with a wireless local area network (WLAN), the present invention is suitable for use in connection with other types of wireless networks, including a wireless wide area network (WWAN), a wireless metropolitan area network (WMAN) and a wireless personal area network (WPAN).

Figure 1:
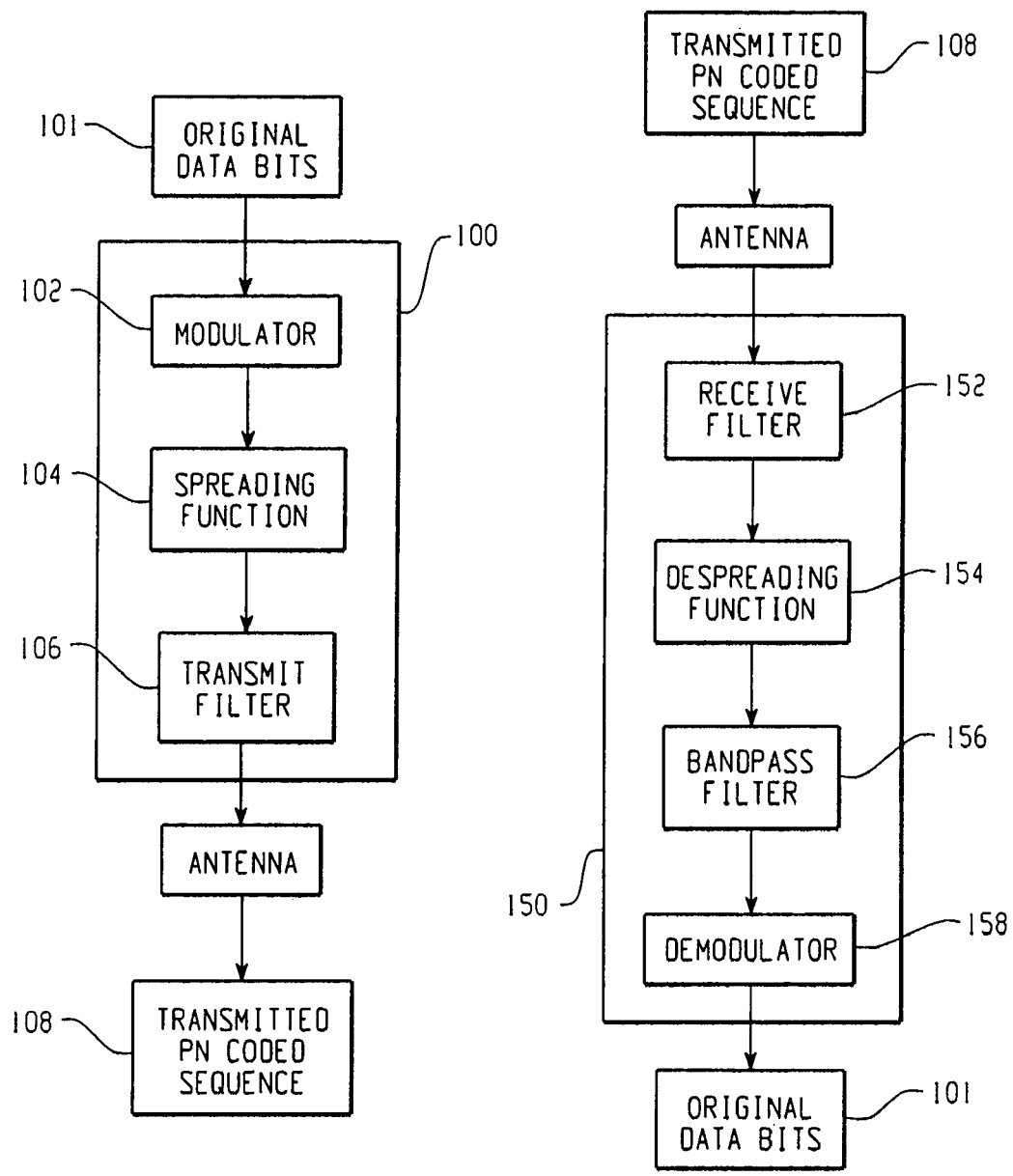
FIG. 1 is a schematic representation of a typical transmitter system and a typical receiver system of a DSSS communication system.
Figure 2A:
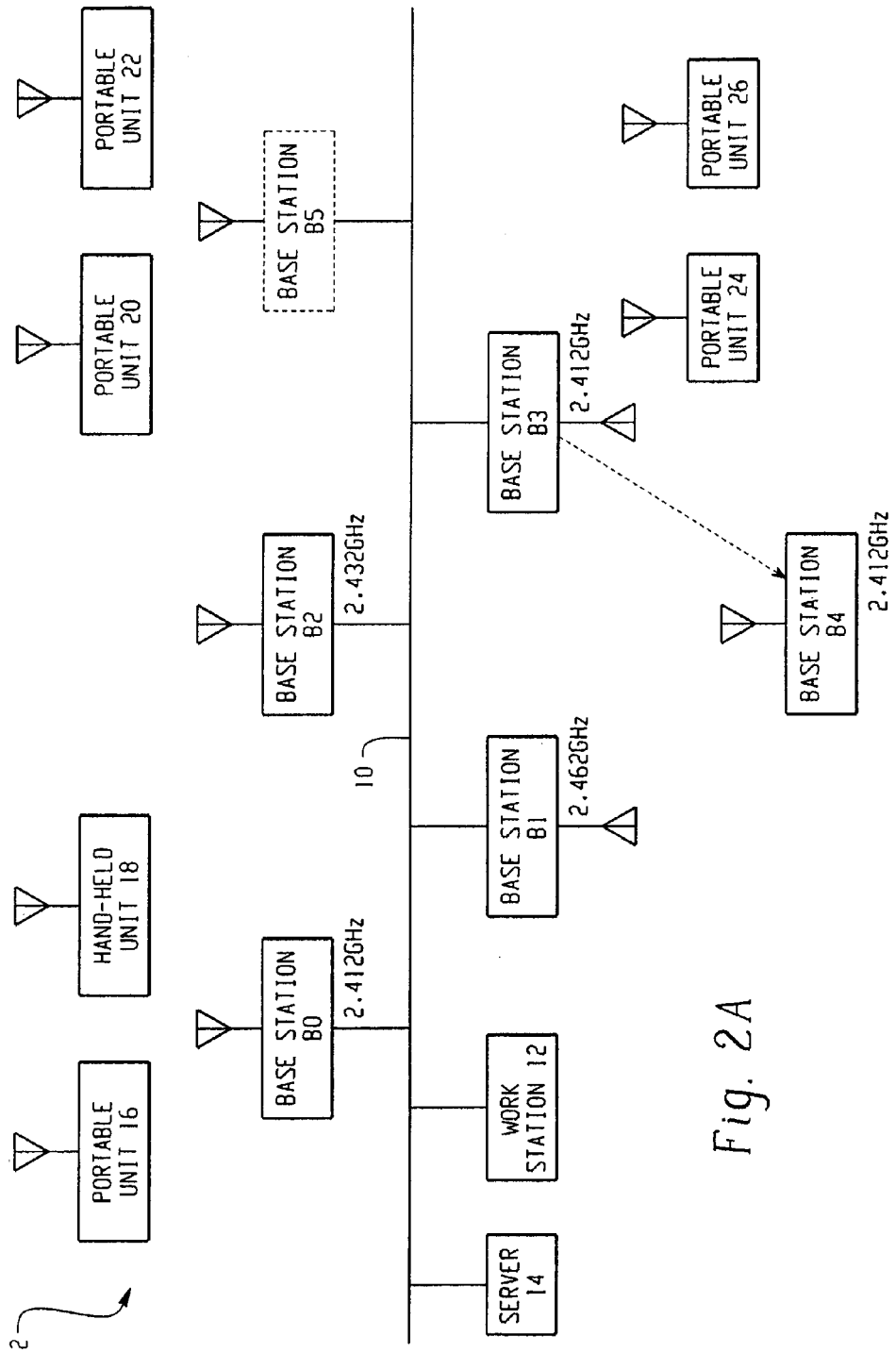
FIG. 2A is a schematic representation of a typical wireless LAN configuration.

Referring now to FIG. 2A, there is shown a typical wireless network used with the present invention. More specifically, FIG. 2A shows a wireless LAN system 2 generally comprised of a plurality of communication devices including mobile stations (i.e., portable units 16, 20, 22, 24 and 26, and hand-held unit 18) and a plurality of base stations (or access points or controller) B0, B1, B2, B3 and B4. The base stations may be connected to a hardwired network backbone or serve as wireless base stations. Each base station can transmit and receive data in its respective cell. Wireless LAN system 2 also includes a cable medium, namely, an Ethernet cable 10, along which all network data packets are transmitted when conveyed between any two network nodes. The principal nodes are direct-wired to the cable 10. These include a work station 12 and a network server 14, but may include a mainframe computer, communication channels, shared printers and various mass storage.

In wireless LAN system 2, base station B4 effectively operates as a repeater, coupled to the cable 10 by the base station B3 and a radio link with the base station B3. Base station B4 has been termed a "base station" because it registers mobile stations in the same manner as the base stations that are direct-wired to the cable 10, and offers the same basic registration services to the mobile stations. The base station B4 and each device to which it offers packet transferring services will, however, be registered with the base station B3 to ensure that packets intended for or transmitted by devices associated with the base station B4 are properly directed through the base station B4.

Each of the base stations B0-B4 may use DSSS (discussed above) as a communications protocol. Accordingly, each of the base stations will have an operating frequency which it utilizes for communications with the associated mobile units. This operating frequency is selected from the list of operating frequencies shown in the table of FIG. 3. In some cases, more than one base unit will be using the same operating frequency. When an additional base station, such as base station B5 is added to a preexisting wireless LAN, the present invention provides a system for dynamically determining the operating frequency for the newly added base station, as will be described in further detail below.

General operation of representative wireless LAN network 2, as discussed above, is known to those skilled in the art, and is more fully discussed in U.S. Pat. No. 5,276,680, which is fully incorporated herein by reference.

Figure 2B:
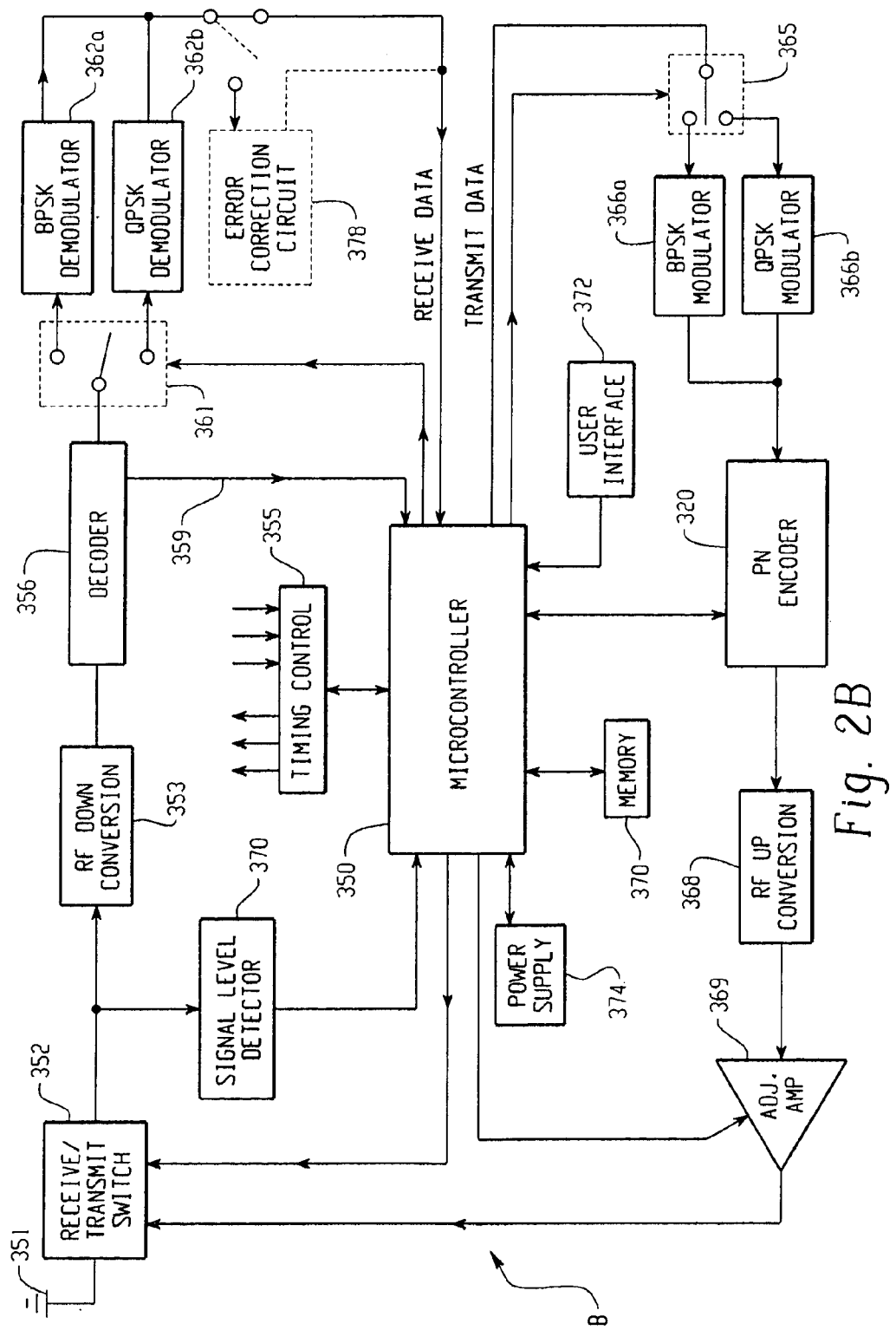
FIG. 2B is block diagram of an exemplary embodiment of a typical base station.

FIG. 2B shows an exemplary embodiment of a typical base unit B. Base unit B includes conventional components, including an antenna 351 for receiving and transmitting data via RF, an RF down conversion circuit 353, an optional signal level detector 370 (e.g., a conventional received signal strength indicator (RSSI)), a decoder 356, BPSK and QPSK demodulators 362a, 362b which are selectable by switching means 361, a microcontroller 350, timing control circuit 355, memory 370, user interface 372, and power supply 374. For transmitting data, Base unit B further includes BPSK and QPSK modulators 366a, 366b which are selectable by switch means 365, PN encoder 320, an RF up conversion circuit 368 and adjustable gain RF output amplifier 369. These components are more fully described in U.S. Pat. No. 5,950,124, which is fully incorporated herein by reference. It should be appreciated that BPSK and QPSK modulators/demodulators are shown only to illustrated the present invention, and that other modulation/demodulation techniques are in common use, including BMOK and CCK.

Due to the ever evolving and constantly changing demands of the modern workplace, it may become advantageous to add additional hardware to existing wireless network. In particular, it may be beneficial to add one more base stations to an existing wireless network, thereby providing a larger geographical area of coverage for the network and accommodating additional users.

One important consideration that must be addressed when adding a base station to an existing LAN is the need to determine the operating frequency of the newly added base station. The selected operating frequency will be used to communicate with mobile units that the base station must support. The physical layer in a network defines the modulation and signaling characteristics for the transmission of data. As previously stated, one typical RF transmission techniques involves direct sequence spread spectrum (DSSS). In the United States, DSSS is defined for operation in the 2.4 GHz (ISM) frequency band, and occupies 83 MHz of bandwidth ranging from 2.400 GHz to 2.483 GHz. However, in other geographic regions different frequencies are allocated. FIG. 3 shows the frequency allocation in North America, Europe and Japan, in accordance with IEEE 802.11. As can be readily appreciated from FIG. 3, there are a total of twelve (12) channels capable of supporting the DSSS architecture. However, in North America only channels 1-11 are allocated, in Europe only channels 3-11 are allocated and in Japan only channel 12 is allocated.

Figure 4:
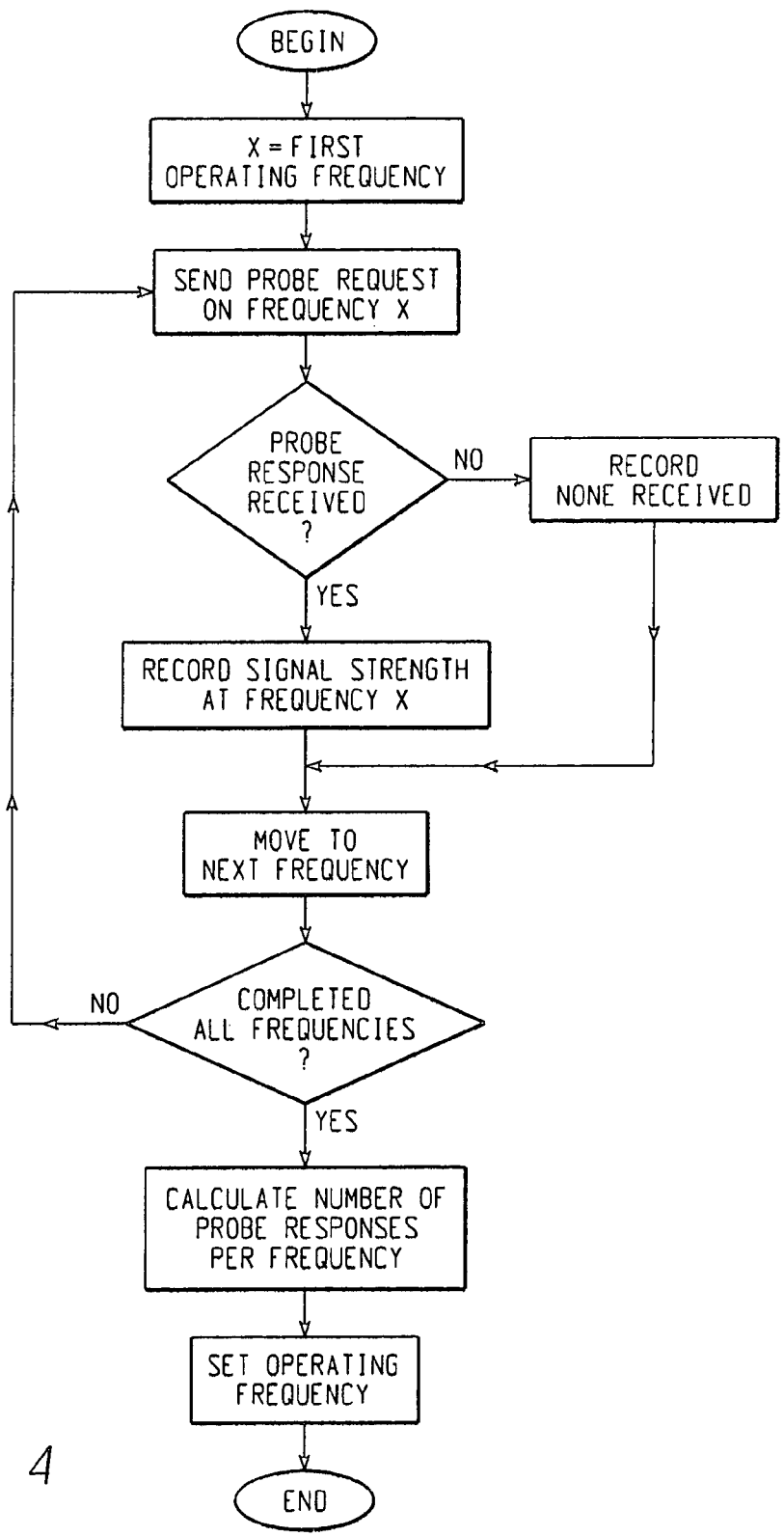
FIG. 4 is a flow chart of the steps for selecting an operating frequency for a communication device, according to a preferred embodiment of the present invention.

Operation of the present invention will now be described with reference to FIG. 4. For the purposes of illustrating a preferred embodiment of the present invention, it is assumed that base station B5, a direct sequence spread spectrum controller, is being added to system 2. In order to determine the proper operating frequency for newly added base station B5, base station B5 must perform a variety of tasks. Base station B5 interrogates the existing base stations in the wireless network by broadcasting one or more request signals to the existing base stations in system 2 which request that they return a response signal to base station B5. All of the existing base stations receiving the request signal and operating at the same frequency as the request signal was broadcast, will transmit a response signal. Therefore, one or more response signals may be received for each request signal broadcast.

The operating frequencies of the existing base stations is determined by the fact that a response signal has been returned in response to broadcast of a request signal at a known frequency. The request signal may be referred to as a "probe request packet" (e.g., "find router" or "router id packet"), while the response signal may be referred to as a "probe response packet" or "router id." It should be appreciated that the request and response signals may be transmitted between base units via a wireless medium (e.g., RF), or via a wired medium, such as the system backbone (e.g., cable 10).

After a request signal is sent at a first frequency, the newly added base unit waits a predetermined period of time (e.g., 10 msec) for receipt of a response signal. If no response signal is received within the predetermined time period, then it is assumed that there are no other base units operating on that first frequency. If a response signal is received, then it is determined that there is an existing base unit operating at that frequency, and optionally the signal strength of the response signal is evaluated. A low signal strength (weak signal) indicates a possibly suitable operating frequency selection for the newly added base unit, whereas a high signal strength (strong signal) indicates a poor selection for the operating frequency of the newly added base unit, since interference is likely. Signal strength may be measured by a variety of parameters depending on the signal types required for a specific application. Preferably, a conventional received signal strength indicator (RSSI) is used to measure the received signal strength of an inbound transmission, utilizing well-known techniques. It should be appreciated that the same request signal (i.e., same frequency) may be transmitted multiple times (e.g., 3 times) to provide a more accurate determination of operating frequencies. After receiving the response signal, the base unit will preferably send an acknowledge signal to the existing base unit that sent the response signal. This will prevent the same base unit from sending additional response signals to the newly added base unit.

Next, the newly added base unit sends another request signal at a different frequency, and conducts the same analysis as above, until all of the appropriate operating frequencies (e.g., see FIG. 3) have been checked to determine whether any other base units are using that frequency. The newly added base unit will select a suitable operating frequency based upon the communication parameter data obtained, namely: (1) a determination of the operating frequencies in use by the other base units, (2) a determination of how many base units are using each of the operating frequencies, and optionally, and (3) a determination of signal strength for each base unit. The selected operating frequency will preferably not cause interference with communications conducted by existing base units, and will provide a balanced use of operating frequencies such that use of possible operating frequencies among base units in the network is evenly distributed.

In a preferred embodiment of the present invention, the newly added base station will select as an operating frequency the least used, non-overlapping frequency. In this regard, some of the possible operating frequencies shown in FIG. 3 are overlapping, while some are non-overlapping (namely, channels 1, 6 and 11). In this regard, each of the listed frequencies is actually the center frequency of the indicated channel. Each channel is 22 MHz wide. Thus, channel 1 (center frequency 2412 MHz) has frequencies in the range of 2401 MHz to 2423 MHz. Likewise, channel 6 (center frequency 2437 MHz) has frequencies in the range of 2426 MHz to 2448 MHz, while channel 11 (center frequency 2462 MHz) has frequencies in the range of 2451 MHz to 2473 MHz. The remaining channels have frequencies which overlap with at least one frequency of the foregoing channels. When non-overlapping frequencies are used, the base units will not interfere with each other. If two base units operate on the same frequency, then the average throughput, for all associated devices will drop. Therefore, one objective of the present invention to have each base unit automatically set their operating frequencies so that they will not interfere with each other. In selecting among the non-overlapping frequencies, the newly added base station may also consider balancing the number of base stations operating among the possible (non-overlapping) frequencies.

In a further embodiment of the present invention, the newly added base station will also obtain information concerning the load on the other base stations, and use this information in selecting its operating frequency (in addition to the other information, discussed above). For instance, load information may be provided in a data field of the response signal in the form of a load value in the range of 1-10, wherein a load value of 10 is indicative of a high load (i.e., large number of communications; high traffic) and a load value of 1 is indicative of a low load (i.e., little or no communications; low traffic). Additional logic is added to each base unit so that it can determine its respective load value. The process for selected the operating frequency of the newly added base station will disfavor operating frequencies that are in use by existing base units having a high load.

It should be appreciated that the present invention contemplates the evaluation of other communication parameters as a means for selecting the operating frequency of a newly added base unit.

Turning now to FIG. 3, the selection of operating frequencies will be described as each base station is added to system 2. Assuming that base station B0 is the first base station to be used, a first non-overlapping frequency is selected (in this case channel 1 at 2.412 GHz). When base station B13 is added, the furthest distant non-overlapping frequency is selected (i.e., channel 11 at 2.462 GHz). When base station B2 is added, the remaining non-overlapping frequency is selected (channel 6 at 2.437 GHz). When base stations B3 and B4 are added to the system, channel 1 is selected base stations B3 and B4 are out of range of base station B0. Again, when base station B5 is added, channel 11 is selected since it is out of range of base station B1.

In general, the first criteria considered when selecting a frequency is to determine whether any non-overlapping are currently available (i.e., not currently being used). If any non-overlapping frequencies are unused, then an unused non-overlapping frequency is selected. If all of the non-overlapping frequencies are in use, then the signal strength is evaluated to determine which base units are in closest range. The frequency of the base unit which has the weakest signal strength is favored for selection of the operating frequency of the newly added base unit. Next, the load associated with each existing base unit may be considered. The frequency in use by a base unit having a high load would be disfavored. It should be appreciated that one or more of the foregoing communication parameters may be considered in selecting the operating frequency of the newly added base station.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A system comprising:
   a plurality of access points;
   wherein each of the plurality of access points is configured to independently scan a plurality of operating frequencies to detect operating frequencies of other of the plurality of access points; and
   wherein each of the plurality of access points is configured to independently select an operating frequency to minimize interference based on non-overlapping frequencies, signal strength and load of the other of the plurality of access points detected;
   wherein highest priority is given to a non-overlapping frequency and second highest priority is given to signal strength; and
   wherein the operating frequency selected is also based on is how many of the other of the plurality of access points are detected on each of the plurality of other operating frequencies.

2. A system according to claim 1, wherein the operating frequency is selected to evenly distribute operating frequencies among the plurality of access points.

3. A system according to claim 1, wherein the operating frequency selected is also based on maximizing throughput for the plurality of access points.

4. A method for wireless base unit to select an operating frequency, comprising:
   scanning a plurality of operating frequencies to detect operating frequencies, signal strength and loads of other base stations within range of the wireless base unit;
   independently selecting the operating frequency to minimize interference based on non-overlapping frequencies, signal strength and the load on the other base stations detected;
   wherein highest priority is given to a non-overlapping frequency and second highest priority is given to signal strength; and
   wherein the selecting step is additionally based on how many of the other access points are detected operating on each of the plurality of operating frequencies.

5. The method of claim 4, wherein the selecting step is additionally based on selecting the operating frequency in a manner so that operating frequencies of the plurality of base unit devices in a wireless network are evenly distributed.

6. The method of claim 4, wherein the selecting step is additionally based on selecting the operating frequency that maximizes throughput.

7. A wireless base station comprising:
   means for detecting other base stations operating on each of a plurality of frequencies within range of the wireless base unit;
   means for acquiring data representative of operating frequencies, signal strength and load of the other base stations operating on the plurality of frequencies from the means for detecting;
   means for determining a non-overlapping frequency; and
   means for selecting the operating frequency to minimize interference non-overlapping frequencies, signal strength and load of the other base stations detected;
   wherein highest priority is given to non-overlapping frequency and second highest priority is given to signal strength; and
   wherein means for selecting an operating frequency is further based on how many of the other base units are detected operating on each of the plurality of frequencies.

8. The wireless base unit of claim 7 wherein the means for selecting an operating frequency further comprises means for evenly distributing operating frequencies.

9. The wireless base unit of claim 7 wherein the means for selecting an operating frequency further comprises means for maximizing throughput.

10. An access point comprising:
    a transceiver operative to transmit and receive signals on any of a plurality of frequencies;
    a controller operatively coupled to the transceiver and configured to select an operating frequency for the transceiver from the plurality of frequencies;
    wherein the transceiver is responsive to the controller to scan a plurality of frequencies to acquire data representative of operating frequencies, signal strength and load of other base stations operating on the plurality of frequencies;
    wherein the controller is configured to select the operating frequency to minimize interference based on non-overlapping frequencies, signal strength and the load of the other access points detected;
    wherein the highest priority is given to non-overlapping frequency and second highest priority is given to signal strength; and
    wherein the controller is configured to select an operating frequency based on how many of the other access points are detected on each of the plurality of frequencies.

11. An access point of claim 10, wherein the controller is configured to select an operating frequency that evenly distributes the plurality of operating frequencies.

12. An access point of claim 10, wherein the controller is configured to select an operating frequency to maximize throughput.

* * * * *

UNITED STATES PATENT AND TRADEMARK OFFICE
CERTIFICATE OF CORRECTION

| | |
|---|---|
| PATENT NO. | : 7,260,620 B1 |
| APPLICATION NO. | : 10/802985 |
| DATED | : August 21, 2007 |
| INVENTOR(S) | : David E. Halasz |

Page 1 of 1

It is certified that error appears in the above-identified patent and that said Letters Patent is hereby corrected as shown below:

In column 1, after the title, please insert the following paragraphs:

--CROSS-REFERENCE TO RELATED APPLICATIONS

This application is a continuation of U.S. Application Serial No. 09/477,842, filed on January 5, 2000, now U.S. Patent No. 6,732,163.--

Signed and Sealed this

Fifteenth Day of April, 2008

JON W. DUDAS
*Director of the United States Patent and Trademark Office*